United States Patent
Bagepalli et al.

(10) Patent No.: US 7,581,921 B2
(45) Date of Patent: Sep. 1, 2009

(54) METHODS AND APPARATUS FOR CONTROLLING ROTARY MACHINES

(75) Inventors: Bharat Sampathkumaran Bagepalli, Niskayuna, NY (US); Patrick Lee Jansen, Scotia, NY (US); Gary R. Barnes, Delanson, NY (US); Thomas Frank Fric, Greer, SC (US); James Patrick Francis Lyons, Niskayuna, NY (US); Kirk Gee Pierce, Simpsonville, SC (US); William Edwin Holley, Greer, SC (US); Corneliu Barbu, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 11/424,951

(22) Filed: Jun. 19, 2006

(65) Prior Publication Data

US 2007/0292260 A1    Dec. 20, 2007

(51) Int. Cl.
F01D 11/22 (2006.01)
(52) U.S. Cl. .......................... 415/14; 415/132
(58) Field of Classification Search .................... 415/14, 415/118, 129, 131, 132, 140, 173.1, 173.2
See application file for complete search history.

(56) References Cited

U.S. PATENT DOCUMENTS

| 4,426,586 | A | 1/1984 | Cecchini | |
|---|---|---|---|---|
| 5,315,159 | A | 5/1994 | Gribnau | |
| 5,584,655 | A | 12/1996 | Deering | |
| 6,137,187 | A | 10/2000 | Mikhail et al. | |
| 6,420,795 | B1 | 7/2002 | Mikhail et al. | |
| 6,600,240 | B2 | 7/2003 | Mikhail et al. | |
| 6,692,222 | B2 * | 2/2004 | Prinz et al. | 415/14 |
| 6,847,128 | B2 | 1/2005 | Mikhail et al. | |
| 6,856,039 | B2 | 2/2005 | Mikhail et al. | |
| 7,004,724 | B2 * | 2/2006 | Pierce et al. | 416/61 |
| 7,095,131 | B2 | 8/2006 | Mikhail et al. | |
| 7,098,552 | B2 | 8/2006 | McCoin | |
| 7,116,006 | B2 | 10/2006 | McCoin | |
| 7,160,083 | B2 * | 1/2007 | Pierce et al. | 416/61 |
| 2003/0215323 | A1 | 11/2003 | Prinz et al. | |

FOREIGN PATENT DOCUMENTS

| DE | 20102029 U1 | 6/2001 |
|---|---|---|
| EP | 1207299 A2 | 5/2002 |

OTHER PUBLICATIONS

European Search Report for Application No. 07106465.3-2315 dated Oct. 16, 2007.

* cited by examiner

*Primary Examiner*—Igor Kershteyn
(74) *Attorney, Agent, or Firm*—James McGinness, Esq.; Armstrong Teasdale LLP

(57) ABSTRACT

A control system for a rotary machine is provided. The rotary machine has at least one rotating member and at least one substantially stationary member positioned such that a clearance gap is defined between a portion of the rotating member and a portion of the substantially stationary member. The control system includes at least one clearance gap dimension measurement apparatus and at least one clearance gap adjustment assembly. The adjustment assembly is coupled in electronic data communication with the measurement apparatus. The control system is configured to process a clearance gap dimension signal and modulate the clearance gap dimension.

20 Claims, 3 Drawing Sheets

METHODS AND APPARATUS FOR CONTROLLING ROTARY MACHINES

STATEMENT REGARDING FEDERALLY SPONSORED RESEARCH & DEVELOPMENT

The U.S. Government has certain rights in this invention as provided for by the terms of Contract No. DE-AC36-99GO10337, Subcontract No. ZAM-4-31235-05 awarded by the Department of Energy/Midwest Research Institute, National Renewable Energy Laboratory Division.

BACKGROUND OF THE INVENTION

This invention relates generally to rotary machines and more particularly, to methods and apparatus for controlling wind turbine blade pitch angles and generator air gap dimensions.

Generally, a wind turbine generator includes a rotor having multiple blades. The rotor is typically mounted to a shaft within a housing, or nacelle, that is positioned on top of a base such as a truss or tubular tower. Utility grade wind turbines (i.e., wind turbines designed to provide electrical power to a utility grid) can have large rotors, e.g., 30 meters (m) (98 feet (ft)) or more in diameter. Blades, attached to rotatable hubs on these rotors, transform mechanical wind energy into a mechanical rotational torque that drives one or more generators. The generators are generally, but not always, rotationally coupled to the rotor through a gearbox. The gearbox steps up the inherently low rotational speed of the turbine rotor for the generator to efficiently convert the rotational mechanical energy to electrical energy, which is fed into a utility grid. Gearless direct-drive wind turbine generators also exist.

In the generator, rotor components and stator components are separated by an air gap that is typically measured in distance units. During operation, a magnetic field, generated by a plurality of permanent magnets, wound magnets mounted on the rotor, and/or currents induced in the rotor iron passes, through a portion of the air gap defined between the rotor, and the stator. The effective and efficient transmission of the magnetic field through the air gap is at least partly dependent on a predetermined magnitude of an air gap radial dimension, i.e., the radial distance between a rotor surface and a stator surface. However, asymmetric and/or transient loads on the rotor may be introduced via the blades. Such loads may tend to deflect the rotor such that the air gap dimension is reduced and/or altered to be non-uniform.

BRIEF DESCRIPTION OF THE INVENTION

In one aspect, a control system for a rotary machine is provided. The rotary machine has at least one rotating member and at least one substantially stationary member positioned such that a clearance gap is defined between a portion of the rotating member and a portion of the substantially stationary member. The control system includes at least one clearance gap dimension measurement apparatus and at least one clearance gap adjustment assembly. The adjustment assembly is coupled in electronic data communication with the measurement apparatus. The control system is configured to process a clearance gap dimension signal and modulate the clearance gap dimension.

In another aspect, a method of operating a rotary machine is provided. The rotary machine has at least one rotating member and at least one substantially stationary member positioned such that a clearance gap is defined between a portion of the at least one rotating member and a portion of the at least one substantially stationary member. The clearance gap has a measurable dimension. The method includes providing a clearance gap control system and rotating the at least one rotating member about the at least one substantially stationary member. The method also includes measuring the clearance gap dimension via the clearance gap control system wherein the clearance gap dimension has a first measured value. The method further includes positioning the at least one rotating member with respect to the at least one substantially stationary member via the clearance gap control system such that the clearance gap dimension has a second measured value that is different than the first measured value.

In a further aspect, a wind turbine generator is provided. The generator includes at least one rotating member and at least one substantially stationary member positioned such that a clearance gap is defined between a portion of the rotating member and a portion of the substantially stationary member. The generator also includes at least one wind turbine blade coupled to the rotating member and a wind turbine generator control system. The control system includes at least one clearance gap dimension measurement apparatus and at least one clearance gap adjustment assembly. The adjustment assembly is coupled in electronic data communication with the measurement apparatus. The control system is configured to process a clearance gap dimension signal and modulate the clearance gap dimension.

DETAILED DESCRIPTION OF THE INVENTION

Figure 1:
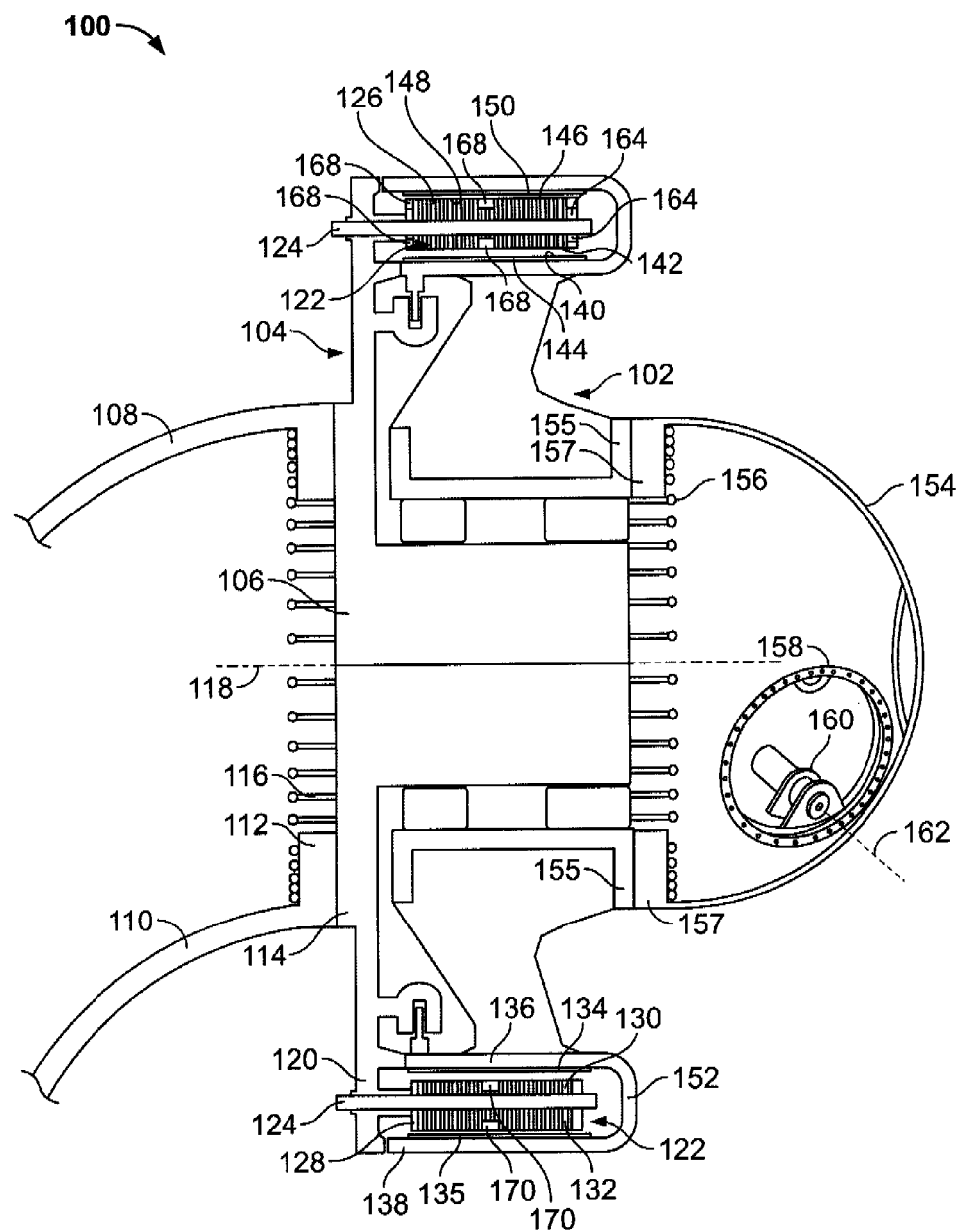
FIG. 1 is a schematic elevation radial illustration of an exemplary wind turbine generator.
Figure 2:
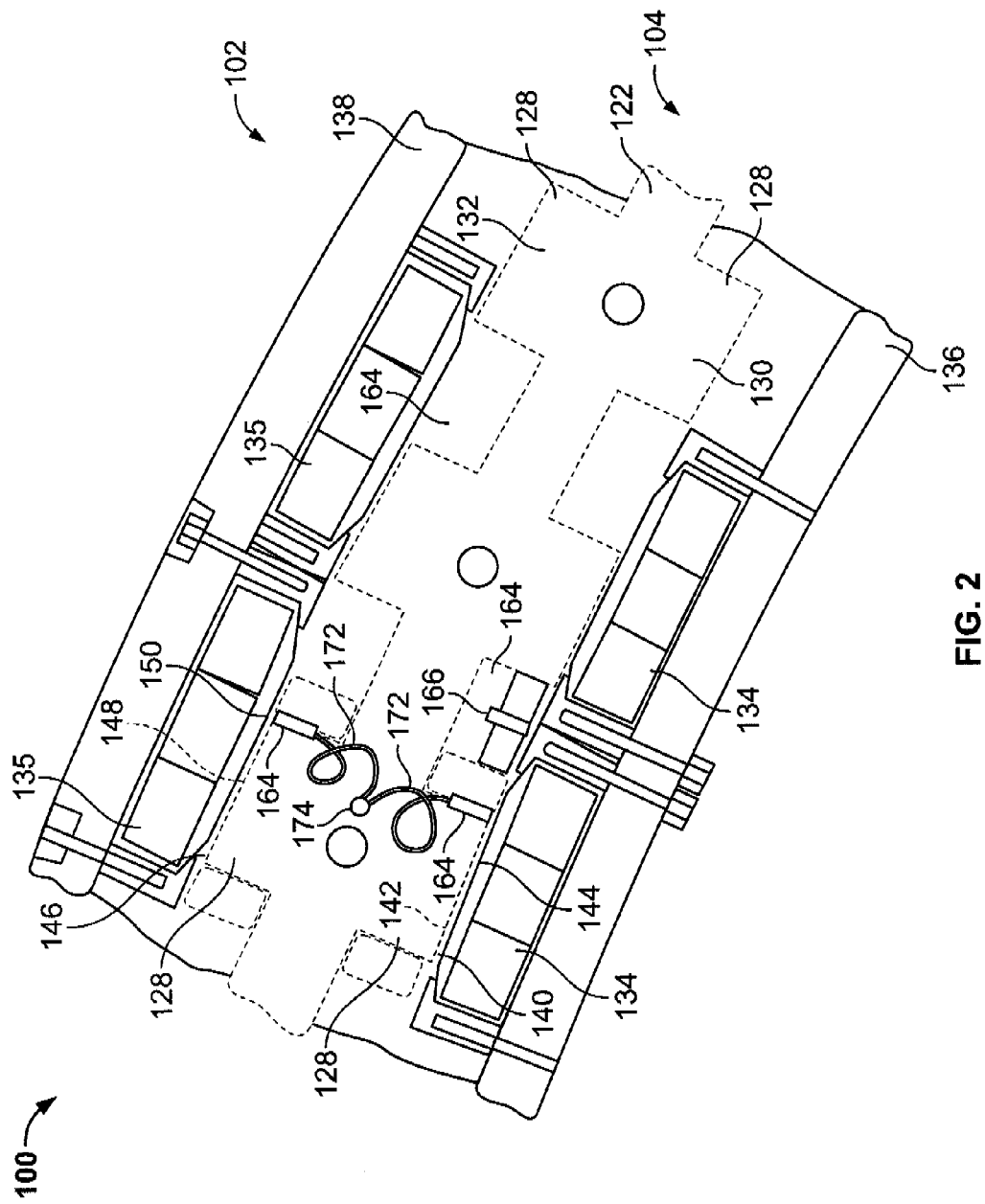
FIG. 2 is a fragmentary cross-sectional schematic illustration of the exemplary wind turbine generator shown in FIG. 1 from an axial perspective.

FIG. 1 is a schematic elevation illustration of an exemplary wind turbine generator 100 that includes a rotor 102 and a stator 104. FIG. 2 is a fragmentary cross-sectional schematic illustration of wind turbine generator 100 from an axial perspective. Axial and radial support of rotor 102 is facilitated by a bearing 106. In the exemplary embodiment, a base 108 couples to a tower (not shown in FIGS. 1 and 2). Base 108 includes a body 110 and a base flange 112. In the exemplary embodiment, the tower is fabricated from tubular steel and has a cavity extending between a supporting surface (not shown in FIGS. 1 and 2) and base 108. In an alternate embodiment, the tower is a lattice tower. The height of the tower is selected based upon factors and conditions known in the art. The supporting surface may include, but not be limited to the earth's surface, a platform, or a lake or ocean bottom. Also, in the exemplary embodiment, wind turbine 100 is a direct-drive wind turbine 100. Alternatively, wind turbine 100 is a gearbox-driven wind turbine generator 100 that includes a coupling that is, but is not limited to, a flexible coupling.

Stator 104 is configured to couple to base flange 112 through a face-to-face engagement of base flange 112 and a complementary stator flange 114. In the exemplary embodiment, stator 104 is coupled to base flange 112 via a plurality of bolts 116 spaced circumferentially about a longitudinal axis 118 of generator 100. Axis 118 is also the rotational axis of rotor 102. In an alternative embodiment, stator 104 is coupled to base flange 112 using welding and/or other fastening means. Stator 104 also includes a stator core mounting rim 120 that extends radially and axially from stator flange 114. In the exemplary embodiment, a stator core 122 is coupled to core mount rim 120 using stator core bolts 124. In one embodiment, stator core 122 includes a plurality of laminated iron core sections 126, sometimes referred to as punchings 126, separated by an insulating material (not shown in FIGS. 1 and 2), extending radially through and axially along stator core 122. Punchings 126 are aligned axially with one another through core 122. Stator core 122 also includes at least one winding coil 128 surrounding at least a portion of core 122. Coil 128 is used to generate an electrical output of wind turbine generator 100. A plurality of stator coils 128 and core 122 define slots 129 wherein wedges (not shown in FIGS. 1 and 2) may be positioned to provide circumferential support for coils 128 to mitigate potential for circumferential movement of coils 128.

In the exemplary embodiment, stator core 122 and coils 128 form a double-sided stator. Stator core 122 and coils 128 include a radially inner portion 130 and a radially outer portion 132. Portions 130 and 132 are separately excited by radially inner magnetic elements 134 and radially outer magnetic elements 135, respectively, that are coupled to rotor 102. Alternatively, generator 100 is a single-sided stator (not shown in FIGS. 1 and 2) and includes either inner portion 130 or outer portion 132.

Magnetic elements 134 and 135 are magnetic poles fixedly coupled to radially inner portion 130 and radially outer portion 132, respectively. In the exemplary embodiment, elements 134 and 135 are permanent magnets. Alternatively, elements 134 and 135 are wound magnets that are powered by an excitation system (not shown in FIGS. 1 and 2). Also, alternatively, an iron rotor core (not shown in FIGS. 1 and 2) configured to facilitate inducing a magnetic field by circulating electric currents within the iron core is substituted for elements 134 and 135.

As discussed above, rotor 102 is a double-sided rotor wherein rotor 102 includes at least one magnetic element 134 spaced circumferentially about an outer periphery of a radially inner rotor rim 136 and at least one magnetic element 134 spaced circumferentially about an inner periphery of a radially outer rotor rim 138. Rotor rims 136 and 138 extend axially in parallel with stator core 122. An inner air gap 140 is defined between an inner periphery 142 of coil 128 and an outer periphery 144 of magnetic elements 134. An outer air gap 146 is defined between an outer periphery 148 of a coil 128 of portion 132 and an inner periphery 150 of magnetic elements 135 coupled to rim 138. Uniformity of air gaps 140 and 146 is beneficial because the magnetic field generated by magnet elements 134 and 135 traverse air gaps 140 and 146 to interact with stator windings 128 to generate a voltage in stator windings 128. Rotor rims 136 and 138 may be coupled together at a distal end by a distal end rotor flange 152 that extends radially from radially inner rotor rim 136 to radially outer rotor rim 138.

A rotatable hub 154 is coupled to rotor 102 via a face-to-face engagement using a plurality of fasteners 156, a rotor flange 155 and a hub flange 157. At least one blade (not shown in FIGS. 1 and 2) is coupled to hub 154 at a hub flanged surface 158 via a face-to-face engagement using retention hardware (not shown in FIGS. 1 and 2). Hub flanged surface 158 is a load transfer region as discussed further below. A blade variable pitch drive assembly 160 is provided to control the pitch of the blades along pitch axis 162 that facilitates driving hub 154 as a result of wind impingement on the blades. In the exemplary embodiment, the pitch of each blade is controlled in a predetermined phased relationship with respect to predetermined operational parameters that include, but are not limited to, the wind velocity and wind direction. Alternatively, the pitch of each blade may be controlled individually. In the exemplary embodiment, rotor 102 has three rotor blades. In an alternative embodiment, rotor 102 has more or less than three rotor blades. The blades are positioned about rotor hub 154 to facilitate rotating rotor 102 to transfer kinetic energy from the wind into usable mechanical energy, and subsequently, electrical energy. The blades are mated to hub 154 by coupling a blade root portion (not shown in FIGS. 1 and 2) to hub 154 at a plurality of load transfer regions. The load transfer regions include a hub load transfer region at surface 154 and a blade load transfer region generally positioned at or near the blade root portion. Loads induced in the blades are transferred to hub 154 via the load transfer regions. Hub 154 transmits loads generated by and/or induced into the blades to rotor 102. Rotational loads transmitted to rotor 102 are translated into a rotational movement of rotor 102. Movement of rotor 102 causes magnetic elements 134 and 135 to move past stator core 122 and windings 128. This movement generates the electrical output of generator 100. Bending loads transmitted to rotor 102 from the blades are discussed further below.

In the exemplary embodiment, the blades may have any length suitable for facilitating power generation from the wind. Typically, blade lengths are between 50 meters (m) (164 feet (ft)) and 100 m (328 ft) for utility scale wind turbines 100. As the wind strikes the blades, rotor 102 is rotated about rotation axis 118. As the blades are rotated and subjected to centrifugal forces, the blades are subjected to various bending moments and other operational stresses. As such, the blades may deflect and/or twist from a neutral, or non-deflected, position to a deflected position and an associated stress may be induced in the blades. Moreover, a pitch angle of the blade, i.e., the angle that determines the blades orientation with respect to the direction of the wind, may be changed by blade variable pitch drive assembly 160 to facilitate increasing or decreasing the blade rotational speed by adjusting the surface areas of the blades that are exposed to the wind forces.

In the exemplary embodiment, a plurality of clearance gap radial dimension measurement apparatus 164, or air gap dimension sensors 164 are positioned within generator 100 to facilitate measuring a distance of gaps 140 and 146. In general, sensors 164 are positioned anywhere within generator 100 such that the sensors perform as described herein. In the exemplary embodiment, sensors 164 are fixedly coupled to a circumferential portion of stator coils 128 and positioned axially on a generator rotor side of generator 100 substantially near a top of generator 100. Alternatively, a plurality of air gap dimension sensors 166 may be positioned within wedge slots 129. Further, alternatively, a plurality of air gap dimension sensors 168 may be axially positioned in an axial center of stator 104. Also, alternatively, sensors 168 may be positioned on stator 104 on a base side of generator 100. In a further alternative embodiment, sensors 170 may be radially positioned at, but not be limited to, substantially near the bottom of generator 100. Sensors 164 are fixedly coupled to a circumferential portion of stator coils 128 using, for example, adhesives, retention hardware and tack welding.

In the exemplary embodiment, sensors 164 are capacitive proximity probes. Alternatively, sensors 164 are any apparatus that performs as described herein. Sensors 164 include at least one cable 172 each that facilitates powering sensors 164 and facilitates transmission of air gap dimension signals. Each cable is routed through a cable passage 174 formed within core 122.

The following discussion is associated with the radially outer components of generator 100. The radially inner components of generator 100 operate in a similar manner. In operation, as inner periphery 150 rotates past outer periphery 148, a dimension of air gap 146 is measured by sensor 164. While gap 146 remains substantially constant and sensor 164 capacitance is substantially constant, sensor 164 transmits a substantially constant gap dimension signal (not shown in FIGS. 1 and 2). In the event that air gap 146 dimension changes, the capacitance of sensor 164 changes and the gap dimension signal transmitted from sensor 164 is altered.

Figure 3:
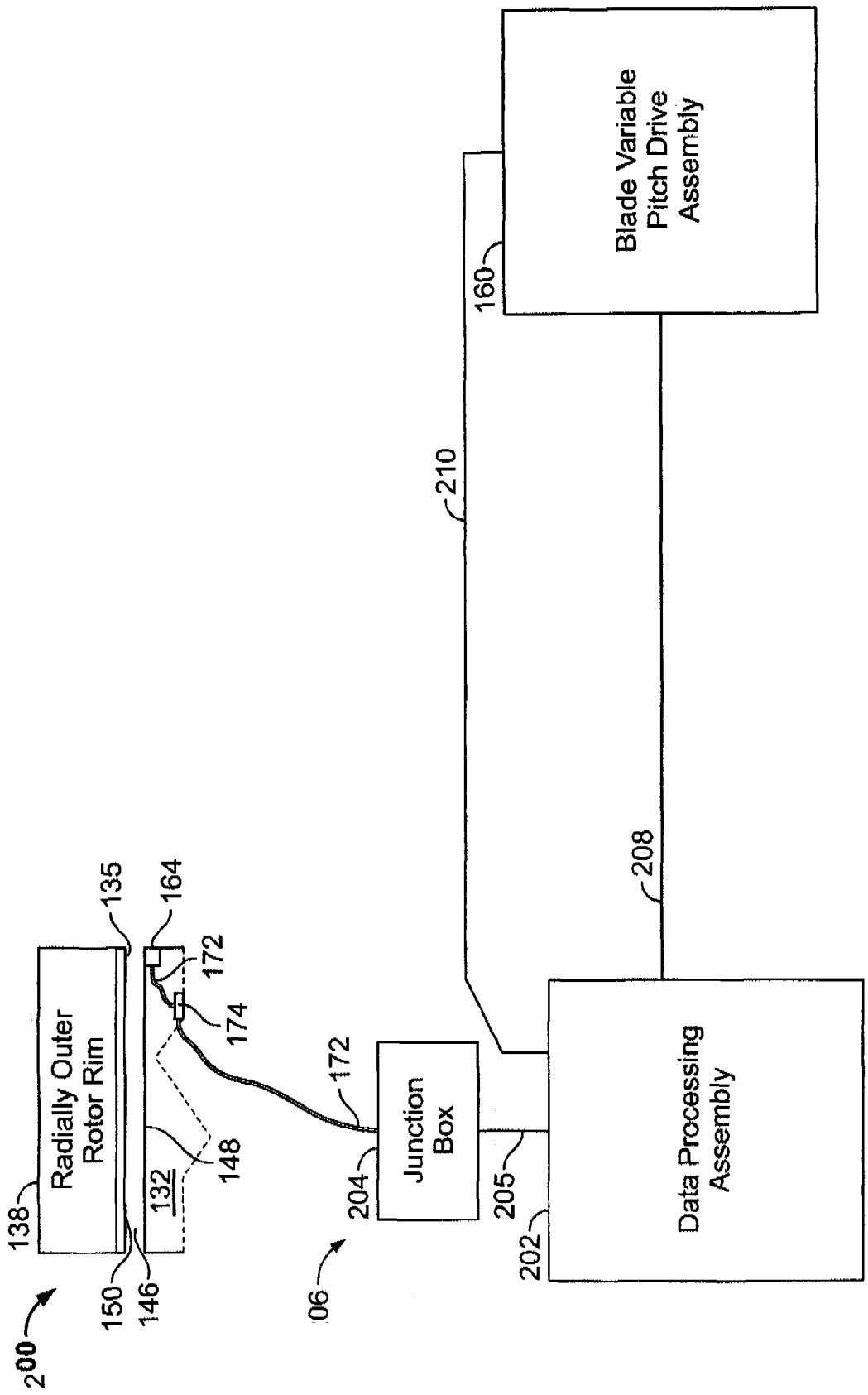
FIG. 3 is a block diagram of an exemplary air gap control system that may be used with the wind turbine generator in FIGS. 1 and 2.

FIG. 3 is a block diagram of an exemplary air gap dimension control system 200 that may be used with wind turbine generator 100 (shown in FIGS. 1 and 2). System 200 includes sensor 164 positioned on stator radially outer portion 132. Sensor 164 is configured to measure a radial distance dimension of air gap 146 between outer periphery 148 of stator portion 132 and inner periphery 150 of magnetic element 135. Moreover, sensor 164 is coupled in electronic data communication with at least one data processing assembly 202 via sensor cable 172 that is routed through cable passage 174, an intermediate electrical junction box 204 and a cable 205. In the exemplary embodiment, sensor cable 172, junction box 204 and cable 205 cooperate to define at least one processor input channel 206. Alternatively, a network of transmitters and receivers operating in the radio frequency (RF) band may be used to define input channel 206. Junction box 204 is configured to receive a plurality of cables similar to sensor cable 172. Moreover, data processing assembly 202 is configured to receive a plurality of cables similar to cable 205.

Data processing assembly 202 includes at least one processor and a memory (neither shown in FIG. 3), at least one input channel 206, at least one output channel 208 and may include at least one computer (not shown in FIG. 3). In the exemplary embodiment, output channel 208 is a cable 208. Alternatively, a network of transmitters and receivers operating in a predetermined portion of a radio frequency (RF) band may be used to define output channel 208.

As used herein, the term computer is not limited to just those integrated circuits referred to in the art as a computer, but broadly refers to a processor, a microcontroller, a microcomputer, a programmable logic controller (PLC), an application specific integrated circuit, and other programmable circuits (neither shown in FIG. 3), and these terms are used interchangeably herein. In the exemplary embodiment, memory may include, but is not limited to, a computer-readable medium, such as a random access memory (RAM) (neither shown in FIG. 3). Alternatively, a floppy disk, a compact disc—read only memory (CD-ROM), a magneto-optical disk (MOD), and/or a digital versatile disc (DVD) (neither shown in FIG. 3) may also be used. Also, in the exemplary embodiment, additional input channels (not shown in FIG. 3) may be, but not be limited to, computer peripherals associated with an operator interface such as a mouse and a keyboard (neither shown in FIG. 3). Alternatively, other computer peripherals may also be used that may include, for example, but not be limited to, a scanner (not shown in FIG. 3). Furthermore, in the exemplary embodiment, additional output channels may include, but not be limited to, an operator interface monitor and/or a printer (neither shown in FIG. 3).

Processors for assembly 202 process information, including air gap position signals from sensors 164. RAM and storage device store and transfer information and instructions to be executed by the processor. RAM and storage devices can also be used to store and provide temporary variables, static (i.e., non-changing) information and instructions, or other intermediate information to the processors during execution of instructions by the processors. Instructions that are executed include, but are not limited to, resident conversion and comparator algorithms. The execution of sequences of instructions is not limited to any specific combination of hardware circuitry and software instructions.

Assembly 202 is coupled in electronic data communication with at least one blade variable pitch drive assembly 160 via output channel 208. Assembly 160 includes a pitch drive motor (not shown in FIG. 3) to control the pitch of the blades (not shown in FIG. 3) to modulate the amount of force imparted to the blades by wind. In the exemplary embodiment, the pitch of each blade is controlled in a predetermined phased relationship with respect to predetermined operational parameters that include, but are not limited to, the wind velocity and wind direction. Alternatively, the pitch of each blade is controlled individually.

Control system 200 further includes at least one feedback channel 210 that is coupled in electronic data communication with assembly 202. In the exemplary embodiment, feedback channel 210 is a cable 210. Alternatively, a network of transmitters and receivers operating in a predetermined portion of a radio frequency (RE) band may be used to define output channel 210. Clearance gap adjustment assembly feedback channel 210 transmits information that may include, but not be limited to, blade pitch positions to assembly 202.

In operation, for example, in the event that some wind forces are such that the blades tend to be positioned to a deflected position, bending loads and subsequent stresses may be induced within the blades. These loads are transferred from the blades to hub 154 via hub flanged surfaces 158 (both shown in FIG. 1). The transferred loads within hub 154 are transferred to rotor 102 via fasteners 156, rotor flange 155 and hub flange 157 (all shown in FIG. 1). In some instances, loads transferred into rotor 102 deflect rotor 102 within the tolerances of bearing 106 (shown in FIG. 1) such that dimensions of at least one of gap 140 (shown in FIGS. 1 and 2) and gap 146 change and predetermined tolerances are approached. Sensors 164 monitor the dimensions of gaps 140 and 146 and transmit the associated air gap radial dimension measurement signal, or gap dimension signal, (not shown in FIG. 3) to assembly 202 by the processor input channel defined by sensor cable 172 and junction box 204. The gap dimension signal is typically a voltage or an electrical current signal converted to a dimension measurement by at least one resident conversion algorithm within the processors of assembly 202 (not shown in FIG. 3).

The processors of assembly 202 generate an internal processor clearance gap dimension signal and use a resident comparator algorithm to compare this dimension measurement to at least one predetermined air gap dimension measurement, or a range thereof. If any deviations are determined, the processors generate an internal processor clearance gap adjustment signal (not shown in FIG. 3) that is converted to a processor output signal (not shown in FIG. 3) by a resident clearance gap adjustment algorithm. The processor output signal is transmitted via output channel 208 to drive assembly 160. Drive assembly 160 includes a pitch drive motor (not shown in FIG. 3) to control the pitch of the blades (not shown in FIG. 3). Drive assembly 160 repositions the blades along pitch axis 162 (shown in FIG. 1) to modulate the pitch angle which in turn modulates the amount of force imparted to the blades by wind.

Drive assembly 160 also transmits a blade pitch angle feedback signal (not shown in FIG. 3) to assembly 202 via feedback channel 210. Assembly 202 receives the blade pitch angle feedback signal and the processors of assembly 202 facilitate the modulation of the magnitude and duration of the output signal transmitted to assembly 160 via output channel 208. As the blade's pitch angle changes, the blade loads change, which subsequently changes the loads transferred to the rotor as discussed above. The dimensions of gaps 140 and 146 are measured throughout the aforementioned blade pitch modulation and the associated dimension signals transmitted to the processors of assembly 202 facilitate the modulation of the magnitude and duration of the output signal transmitted to assembly 160 via output channel 208. Upon dimensions of air gaps 140 and 146 being changed to a predetermined parameter or within a range of predetermined parameters, assembly 160 maintains the pitch angle of the blades at a predetermined parameter or within a range of predetermined parameters.

The methods and apparatus for a wind turbine generator control system described herein facilitate operation of a wind turbine generator. More specifically, the wind turbine generator air gap control system as described above facilitates an efficient and effective mechanical load transfer scheme. Also, the robust, air gap control system facilitates generator efficiency. Such control system also facilitates wind turbine generator reliability, and reduced maintenance costs and wind turbine generator outages.

Exemplary embodiments of wind turbine control systems as associated with wind turbine generators are described above in detail. The methods, apparatus and systems are not limited to the specific embodiments described herein nor to the specific illustrated wind turbine generators.

While the invention has been described in terms of various specific embodiments, those skilled in the art will recognize that the invention can be practiced with modification within the spirit and scope of the claims.

What is claimed is:

1. A control system for a rotary machine, said rotary machine having at least one rotating member and at least one stationary member positioned such that a clearance gap is defined between a portion of said rotating member and a portion of said stationary member, said control system comprising:
   at least one clearance gap dimension measurement apparatus; and
   at least one clearance gap adjustment assembly coupled to a wind turbing blade, said adjustment assembly coupled in electronic data communication with said measurement apparatus, said control system configured to process a clearance gap dimension signal and modulate a clearance gap dimension by modulating a pitch of the wind turbine blade.

2. A control system in accordance with claim 1 wherein said measurement apparatus comprises a capacitive proximity probe that generates an output signal substantially equivalent to said clearance gap dimension.

3. A control system in accordance with claim 1 wherein said measurement apparatus is securely coupled to said stationary member.

4. A control system in accordance with claim 1 wherein said measurement apparatus is positioned at a radially outer portion of said stationary member.

5. A control system in accordance with claim 1 wherein said measurement apparatus is positioned at a radially inner portion of said stationary member.

6. A control system in accordance with claim 1 further comprising:
   at least one processor input channel coupled in electronic data communication with said measurement apparatus, said input channel facilitates transmission of said clearance gap dimension signal;
   at least one processor coupled in electronic data communication with said measurement apparatus via said input channel, said processor configured to receive and process said clearance gap dimension signal;
   at least one processor output channel coupled in electronic data communication with said processor and said adjustment assembly, said processor output channel facilitates transmission of a processor output signal; and
   at least one clearance gap adjustment assembly feedback channel coupled in electronic data communication with said adjustment assembly and said processor.

7. A control system in accordance with claim 6 wherein said processor comprises:
   at least one resident conversion algorithm configured to receive said clearance gap dimension signal, said algorithm further configured to generate at least one predetermined processor clearance gap dimension signal;
   at least one resident comparator algorithm configured to receive said processor clearance gap dimension signal, said comparator algorithm comprising at least one predetermined value configured for comparison with said processor clearance gap dimension signal, said comparator algorithm further configured to generate a processor clearance gap adjustment signal; and
   at least one resident clearance gap adjustment algorithm configured to receive said processor clearance gap adjustment signal, said clearance gap adjustment algorithm comprising at least one predetermined value, said clearance gap adjustment algorithm configured to generate said processor output signal.

8. A control system in accordance with claim 1 wherein said adjustment assembly is configured to adjust said clearance gap dimension via an adjustment of at least one rotary machine operating parameter.

9. A method of operating a rotary machine, the rotary machine having at least one rotating member and at least one substantially stationary member positioned such that a clearance gap is defined between a portion of the at least one rotating member and a portion of the at least one substantially stationary member, the clearance gap having a measurable dimension, said method comprising:
   providing a clearance gap control system coupled to at least one wind turbine blade;
   rotating the at least one rotating member about the at least one substantially stationary member;
   measuring the clearance gap dimension via the clearance gap control system wherein the clearance gap dimension has a first measured value; and
   positioning the at least one rotating member with respect to the at least one substantially stationary member via the clearance gap control system by modulating a pitch of the at least one wind turbine blade such that the clearance gap dimension has a second measured value that is different than the first measured value.

10. A method in accordance with claim 9 wherein said providing a clearance gap control system comprises:
   providing at least one clearance gap dimension measurement apparatus and at least one clearance gap adjustment assembly;
   positioning at least one clearance gap dimension measurement apparatus within the stationary member; and
   coupling the clearance gap dimension measurement apparatus to the clearance gap adjustment assembly.

11. A method in accordance with claim 10 wherein positioning at least one clearance gap dimension measurement apparatus within the stationary member comprises securely coupling the clearance gap measurement apparatus to a predetermined radial and circumferential portion of the substantially stationary member such that clearance gap dimension measuring is facilitated.

12. A method in accordance with claim 11 wherein said securely coupling the clearance gap measurement apparatus comprises using at least one of an adhesive, a mechanical fastener, and tack welding.

13. A method in accordance with claim 10 wherein said coupling the clearance gap dimension measurement apparatus to the clearance gap adjustment assembly comprises:
   providing at least one processor input channel, at least one processor, at least one processor output channel, and at least one clearance gap adjustment assembly feedback channel;
   coupling the measurement apparatus to the processor input channel;
   coupling the processor input channel to the processor;
   coupling the processor to the processor output channel;
   coupling the processor output channel to the adjustment assembly; and
   coupling the feedback channel to the adjustment assembly and the processor.

14. A method in accordance with claim 10 wherein the rotary machine is a wind turbine generator having at least one wind turbine blade coupled to the at least one rotating member and the clearance gap adjustment assembly is a blade variable pitch drive assembly coupled to the at least one wind turbine blade, wherein positioning the at least one rotating member with respect to the at least one substantially stationary member via the clearance gap control system comprises modulating the blade variable pitch drive assembly such that a bending load on the at least one rotating member is changed.

15. A wind turbine generator comprising:
   at least one rotating member;
   at least one substantially stationary member positioned such that a clearance gap with a measurable clearance dimension is defined between a portion of said rotating member and a portion of said substantially stationary member;
   at least one wind turbine blade coupled to said rotating member; and
   a wind turbine generator control system comprising at least one clearance gap dimension measurement apparatus and at least one clearance gap adjustment assembly, said adjustment assembly coupled with said at least one wind turbine blade and coupled in electronic data communication with said measurement apparatus, said control system configured to process a clearance gap dimension signal and modulate said clearance dimension by modulating a pitch of said at least one wind turbine blade.

16. A wind turbine generator in accordance with claim 15 wherein said measurement apparatus comprises a capacitive proximity probe that generates an output signal substantially equivalent to said clearance gap dimension.

17. A wind turbine generator in accordance with claim 15 wherein said wind turbine generator is at least one of a direct-drive generator and a geared-drive generator.

18. A wind turbine generator in accordance with claim 15 wherein said control system further comprises:
   at least one processor input channel coupled in electronic data communication with said measurement apparatus, said input channel facilitates transmission of said gap dimension signal;
   at least one processor coupled in electronic data communication with said measurement apparatus via said input channel, said processor configured to receive and process said gap dimension signal;
   at least one processor output channel coupled in electronic data communication with said processor and said adjustment assembly, said processor output channel facilitates transmission of a processor output signal; and
   at least one clearance gap adjustment assembly feedback channel coupled in electronic data communication with said adjustment assembly and said processor.

19. A wind turbine generator in accordance with claim 18 wherein said processor comprises:
   at least one resident conversion algorithm configured to receive said gap dimension signal, said algorithm further configured to generate at least one predetermined processor output signal;
   at least one resident comparator algorithm configured to receive said processor dimension signal, said comparator algorithm comprising at least one predetermined value configured for comparison with said processor dimension signal, said comparator algorithm further configured to generate a processor clearance gap adjustment signal; and
   at least one resident clearance gap adjustment algorithm configured to receive said processor adjustment signal, said clearance gap adjustment algorithm comprising at least one predetermined value, said clearance gap adjustment algorithm configured to generate said processor output signal.

20. A wind turbine generator in accordance with claim 15 wherein said adjustment assembly is configured to adjust said clearance gap dimension via an adjustment of at least one wind turbine generator operating parameter.

* * * * *